(12) United States Patent
Osborne et al.

(10) Patent No.: US 6,347,351 B1
(45) Date of Patent: Feb. 12, 2002

(54) METHOD AND APPARATUS FOR SUPPORTING MULTI-CLOCK PROPAGATION IN A COMPUTER SYSTEM HAVING A POINT TO POINT HALF DUPLEX INTERCONNECT

(75) Inventors: Randy B. Osborne, Beaverton; David J. Harriman, Portland, both of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/433,653

(22) Filed: Nov. 3, 1999

(51) Int. Cl.[7] ............................................... G06F 13/14
(52) U.S. Cl. ........................................................ 710/119
(58) Field of Search ................................. 710/107, 119, 710/123, 125, 242, 241

(56) References Cited

U.S. PATENT DOCUMENTS 5,682,508 A    10/1997   Hocker
5,915,101 A *  6/1999   Kleineberg et al. .......... 710/107
6,145,039 A * 11/2000   Ajanovic et al. ............ 710/105
6,256,697 B1 * 7/2001   Ajanovic et al. ............ 710/113

FOREIGN PATENT DOCUMENTS

DE    4426123 A1   2/1996   ......... G06F/13/366
EP    0552507 A1   7/1993   ........... G06F/13/14

OTHER PUBLICATIONS

PCT Search Report, PCT/US 00/26875, 3 pages, Mar. 15, 2001.

* cited by examiner

Primary Examiner—Glenn A. Auve
(74) Attorney, Agent, or Firm—Blakely, Sokoloff, Taylor & Zafman LLP

(57) ABSTRACT

According to one embodiment, a computer system comprises a central processing unit (CPU), a memory control hub (MCH) coupled to the CPU, a point to point interface coupled to the MCH; and an input/output control hub (ICH) coupled to the point to point interface. The MCH delays arbitration of a request to access the point to point interface until the access request is received at the ICH, and ICH delays arbitration of a request to access the point to point interface until the access request is received at the MCH.

16 Claims, 12 Drawing Sheets

US 6,347,351 B1

METHOD AND APPARATUS FOR SUPPORTING MULTI-CLOCK PROPAGATION IN A COMPUTER SYSTEM HAVING A POINT TO POINT HALF DUPLEX INTERCONNECT

FIELD OF THE INVENTION

The present invention pertains to computer systems. More particularly, the invention pertains to increasing the length between components coupled via a hub interface.

BACKGROUND OF THE INVENTION

Since the advent of computer systems, there has been a continuous push to reduce production costs in order to provide quality systems at reduced monetary values. One major factor that increases production costs is the expense associated with inter-chip connections. The number of pins that are necessary to make chip connections increase production costs of a computer system. As a result, there is an ever-increasing demand to make inter-chip connections fast and narrow. One example of a fast and narrow interconnect is the hub interface.

A hub interface is an input/output (I/O) interconnect for connecting I/O hubs and Peripheral Component Interconnect (PCI) bridges adhering to a Specification Revision 2.1 bus developed by the PCI Special Interest Group of Portland, Oreg., to a memory controller hub. A Hub interface is a half-duplex bus with a distributed arbiter. Synchronization on the interface occurs by a global clock and two request (REQ) signals. Agents at each side of the interface assert REQ signals to convey a request to the other agent. For example, one agent (e.g., side A) sends a request signal to the other agent (e.g., side B), while side B transmits a request to side A. The REQ signals are sampled at each side, and a decision is made as to which side will be granted access of the interface.

FIG. 6 is a block diagram of an exemplary hub interface. The hub interface includes agent A and agent B coupled by request signals (REQA and REQB) and a data component. Each agent includes an arbiter. The arbiters arbitrate for ownership of the hub interface. The assertion of either an REQA signal or a REQB signal is an arbitration event. At each arbitration event, the arbiters within examine both the REQA and REQB signals and determine ownership of the hub interface independently and simultaneously. When the hub interface is idle, the first of either agent A or B to assert its request wins ownership. If agents A and B request ownership simultaneously when the hub interface is idle, the least recently serviced hub agent wins ownership.

Typical hub interfaces assume that all signals propagate to the opposite end in less than one base clock cycle (including the effect of clock-to-out and setup times). However, there may be certain applications (e.g., server systems) in which the desired length of a hub interface segment has more than a one clock of end-to-end delay (i.e., hub interface is longer). On the other hand, keeping the end-to-end delay to a single clock cycle limits the clock rate, and hence the bandwidth. Therefore, it would be advantageous to develop a method and mechanism to increase the length of hub interfaces without sacrificing system performance.

SUMMARY OF THE INVENTION

According to one embodiment, a computer system comprises a first agent, a point to point half duplex interface coupled to the first agent and a second agent coupled to the point to point half duplex interface. The first agent delays arbitration of a request to access the point to point half duplex interface until the access request is received at the second agent, and the second agent delays arbitration of a request to access the point to point half duplex interface until the access request is received at the first agent.

BRIEF DESCRIPTION OF THE DRAWINGS

The invention is illustrated by way of example and not limitation in the figures of the accompanying drawings, in which like references indicate similar elements, and in which.

DETAILED DESCRIPTION

A method and mechanism for increasing the length between components coupled via a hub interface is described. In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Figure 1:
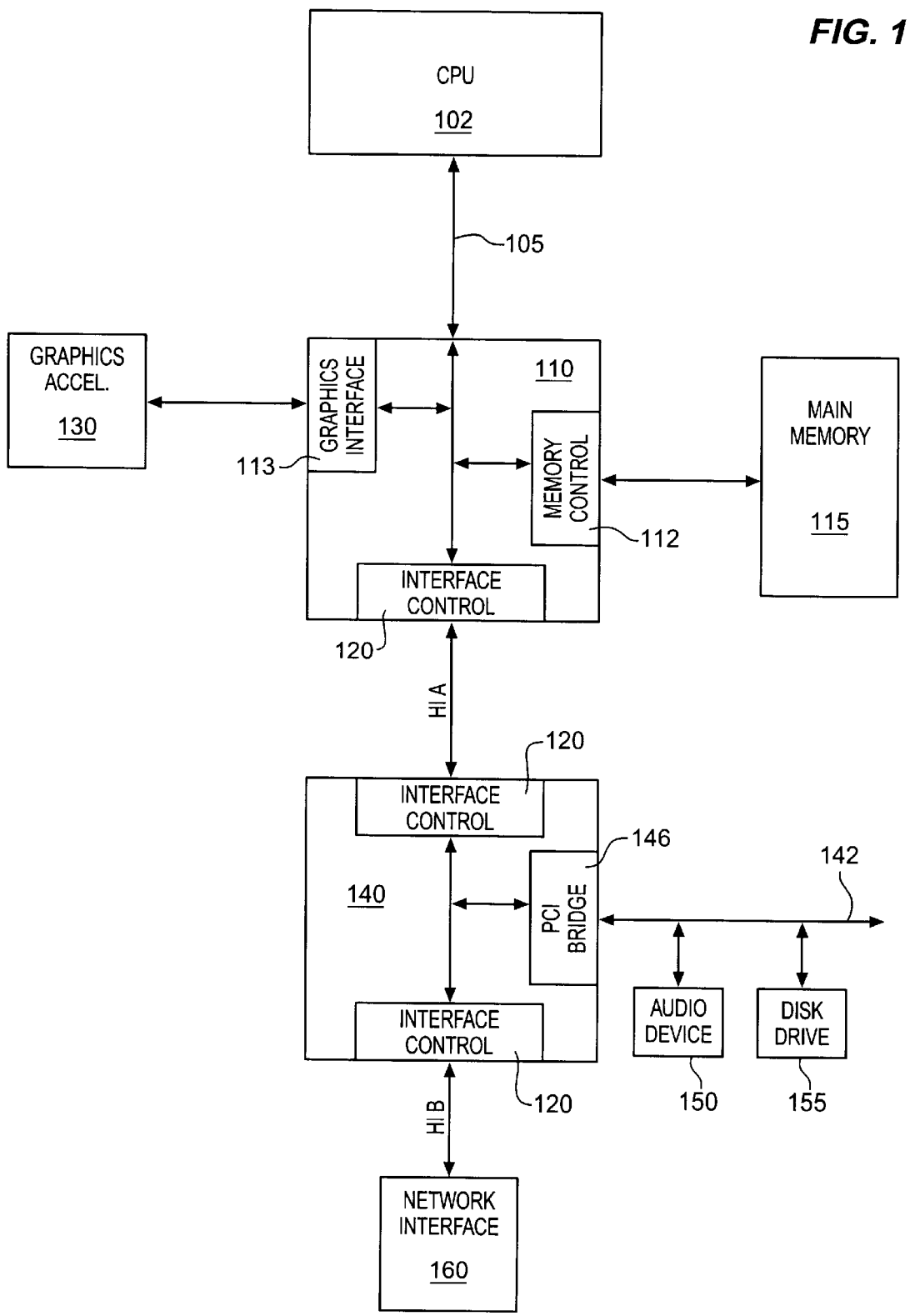
FIG. 1 is a block diagram of one embodiment of a computer system.

FIG. 1 is a block diagram of one embodiment of a computer system 100. Computer system 100 includes a central processing unit (CPU) 102 coupled to bus 105. In one embodiment, CPU 102 is a processor in the Pentium® family of processors including the Pentium® II processor family and Pentium® III processors available from Intel Corporation of Santa Clara, Calif. Alternatively, other CPUs may be used.

A memory control hub (MCH) 110 is also coupled to bus 105. MCH 110 may include a memory controller 112 that is coupled to a main system memory 115. Main system memory 115 stores data and sequences of instructions that are executed by CPU 102 or any other device included in system 100. In one embodiment, main system memory 115 includes dynamic random access memory (DRAM). However, main system memory 115 may be implemented using other memory types. Additional devices may also be coupled to bus 105, such as multiple CPUs and/or multiple system memories.

MCH 110 may also include a graphics interface 113 coupled to a graphics accelerator 130. In one embodiment, graphics interface 113 is coupled to graphics accelerator 130 via an accelerated graphics port (AGP) that operates according to a Specification Revision 2.0 interface developed by Intel Corporation of Santa Clara, Calif. In addition, MCH 110 includes a hub interface controller 120. Interface controller 120 is used to couple MCH 110 to an input/output control hub (ICH) 140 via a hub interface A. ICH 140 provides an interface to input/output (I/O) devices within computer system 100. ICH 140 also includes a hub interface controller 120 that is used for coupling to MCH 110.

ICH 140 may include other interface controllers 120. For example, a second interface controller 120 may be coupled to a network interface 160 via a hub interface B. Nevertheless, one of ordinary skill in the art will appreciate that other hub interface controllers 120 may be coupled to other devices.

Devices coupled together via a hub interface may be referred to as hub interface agents. A hub interface agent that is positioned closer to CPU 102 in computer system 100 in terms of travel distance may be referred to as an upstream agent, while an agent that is further away from CPU 102 is referred to as a downstream agent. For example, for the MCH 110/ICH 140 hub interface, MCH 110 is the upstream agent and ICH 140 is the downstream agent.

ICH 140 may also include a PCI bridge 146 that provides an interface to a PCI bus. PCI bridge 146 provides a data path between CPU 102 and peripheral devices. Devices that may be coupled to PCI bus 142 include an audio device 150 and a disk drive 155. However, one of ordinary skill in the art will appreciate that other devices may be coupled to PCI bus 142. In addition, one of ordinary skill in the art will recognize that CPU 102 and MCH 110 could be combined to form a single chip. Further graphics accelerator 130 may be included within MCH 110 in other embodiments.

Figure 2:
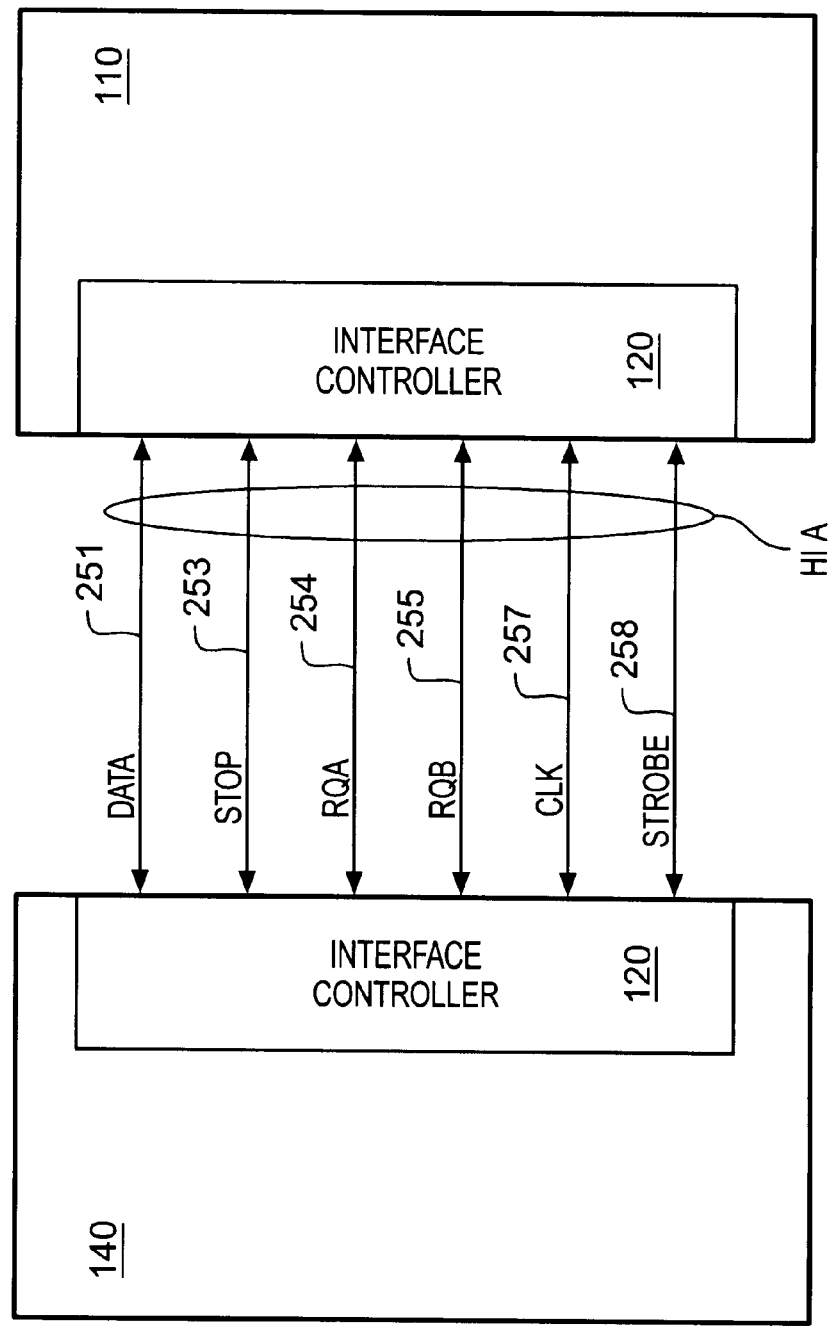
FIG. 2 is a block diagram of one embodiment of a memory control hub (MCH) and an input/output control hub (ICH) connected via a hub interface bus.

FIG. 2 is a block diagram of one embodiment of MCH 110 coupled to ICH 140 via hub interface A. A hub interface is a mechanism for connecting main building blocks of the core logic of a computer system, such as computer system 100, via a relatively narrow and relatively high bandwidth data path. Between individual components in computer system 100, such as between MCH 110 and ICH 140, the connection is implemented in a point-to-point fashion. According to one embodiment, transfer of information across the hub interface bus is accomplished using a packet-based split-transaction protocol. Hub interfaces will be discussed in more detail below. The hub interface includes a bi-directional data path 251, a stop signal 253, a request A (RQA) signal 254, a request B (RQB) signal 255, a clock (CLK) signal 257 and data strobe (STROBE) signals 258. According to one embodiment, data path 251 is 8 binary bits wide. However, data path 251 may be any width (e.g., 16, 32 etc.) in other embodiments. Stop signal 253 is a bi-directional signal used for flow control. According to one embodiment, stop signal 253 is transmitted from a first agent to a second agent in order to indicate that the buffers of the first agent is full and that the first agent cannot continue to receive data from the second agent. Consequently, the second agent stops the transmission of data.

RQA signal 254 and RQB signal 255 are request signals that, during normal system operation, are asserted in order to request control of the hub interface. STROBE signals 258 are used to synchronize data into a hub agent while operating in a source synchronous mode. According to one embodiment, STROBE signals 258 may clock data at four times the frequency of the clock signal. Alternatively, STROBE signals 258 may operate at a multiple of the clock signal other than four. For example, STROBE signals 258 may run at a rate of eight times that of the clock signal 257. Further, hub interface A may include other signal paths, such as a reset signal for resetting system 100.

According to one embodiment, MCH 110 and ICH 140 may be situated such that the signals transmitted on hub interface A (e.g., RQA 254, RQB 255, DATA 251, etc.) incur a clock propagation delay before reaching a destination. In one embodiment, two clock cycles are required for a signal to travel between MCH 110 to ICH 140 across hub interface A. According to a further embodiment, in order that the remote agent does not sample signals in a forbidden time zone, the delay must be adjusted so that the clock out time, setup time and propagation delay of a signal transmitted from the nearby agent is greater than the propagation delay multiplied by the base clock period. Using a base clock period of one for example, a RQB signal 255 transmitted from ICH 140 may not be received at MCH 110 until after the first clock cycle has elapsed.

Figure 3:
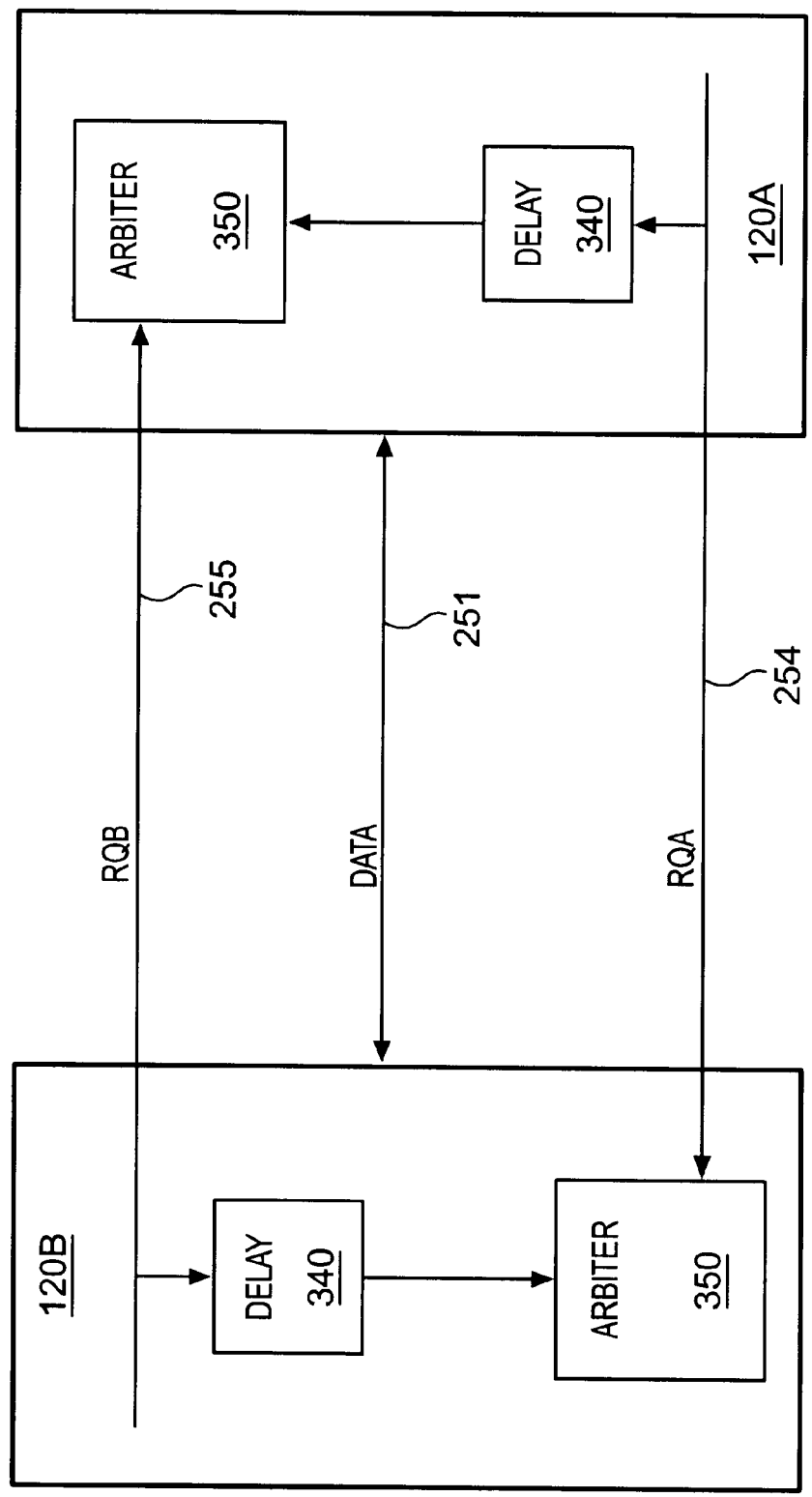
FIG. 3 is a block diagram of one embodiment of interface controllers.

FIG. 3 is a block diagram of one embodiment of interface controllers 120A and 120B for implementing a hub interface with signal propagation delays. Interface controller 120A represents the interface controller within MCH 110, while interface controller 120B represents the interface controller within ICH 140. Each interface controller 120 includes a delay module 340 and an arbiter 350. Delay modules 340 delay arbitration requests before they are received by the arbiter 350 within the same interface controller 120. For example, delay module 340 within interface controller 120B delays a RQB 255 signal before it is received by arbiter 350 within interface controller 120B, and delay module 340 within interface controller 120A delays a RQA 254 signal before it is received by arbiter 350 within interface controller 120A. In one embodiment, delay modules 340 include one or more register latches. However, one of ordinary skill in the art will appreciate that other devices may be used to provide a delay.

According to one embodiment, delay modules 340 are configured with a delay that is equivalent to the propagation delay across hub interface A. For example, if two clock cycles are required for RQB signals 255 to be received at arbiter 350 within interface controller 120A (e.g., a 1 clock propagation delay), delay module 340 delays RQB signals 255 one cycle before transmitting it to arbiter 350 within interface controller 120B.

Arbiters 350 arbitrate for ownership of hub interface A. The assertion of either an RQA signal 254 or an RQB signal 255 is an arbitration event. At each arbitration event, arbiter 350 within interface controllers 120A and 120B examine both the RQA 254 and the RQB 255 and determine ownership of hub interface independently and simultaneously. As described above, in order for the RQA 254 and RQB 255 signals to be examined simultaneously at each arbiter, delay module 340 in the interface controller 120 transmitting the request signal delays the signal to compensate for the propagation delay incurred before the signal is received at the other arbiter 350. When the hub interface is idle, the first of either the upstream or downstream agents to have its request signal (RQA 254 and RQB 255, respectively) sampled asserted wins ownership. If the upstream and downstream agents request ownership simultaneously when the hub interface is idle, the least recently serviced hub agent wins ownership.

Figure 4:
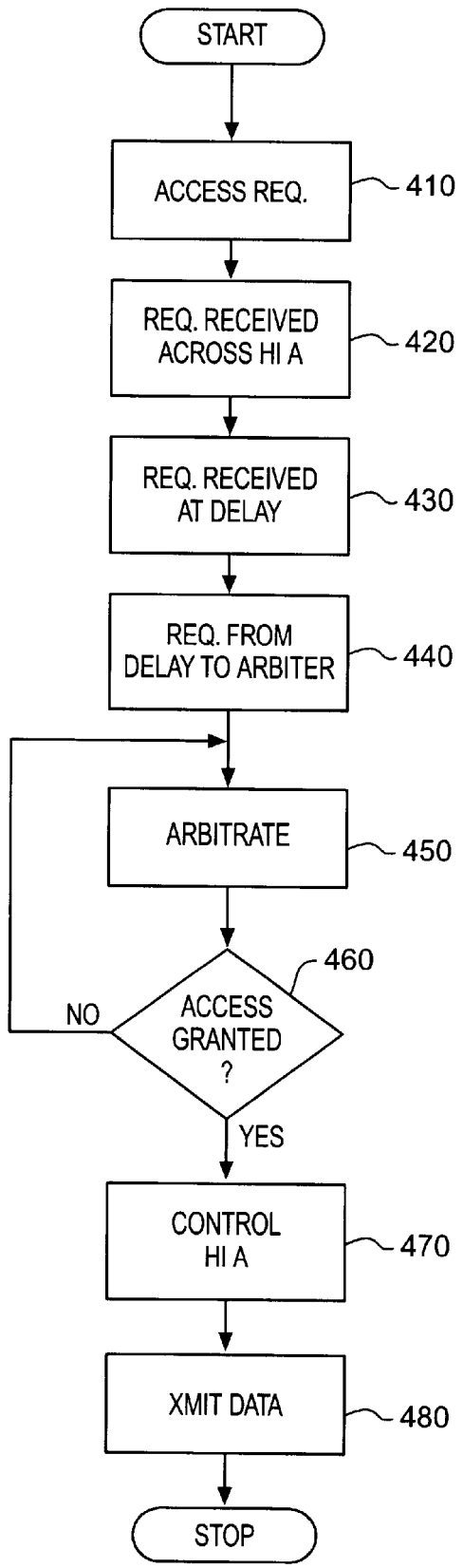
FIG. 4 is a flow diagram for one embodiment of the operation of interface controllers.

FIG. 4 is a flow diagram for one embodiment of the operation of interface controllers 120 for implementing a multi-clock propagation delay interface. At process block 410, a request signal (e.g., RQA or RQB) is received at an interface controller 120 to access hub interface A. At process block 420, the request signal is transmitted to arbiter 350 in an interface controller 120 coupled on the other side of hub interface A. At process block 430, the request signal is received at delay module 340 within the interface controller in which the signal was initiated. At process block 440, the request is transmitted from delay module 340 to the arbiter 350 within the same interface controller 120 after the requisite clock cycle delay (e.g., one clock cycle) corresponding with the propagation delay across hub interface A. Consequently, the request signal is received at both arbiters 350 in time to be sampled by the same clock edge.

At process block 450, arbiters 350 within both of the interface controllers 120 arbitrate in order to determine whether the request will be granted. As described above, the arbiters 350 arbitrate independently and simultaneously. At process block 460, it is determined which requesting interface controller 120 is granted access. If access is granted, the requesting interface controller gains control of hub interface A, process block 470. At process block 480, data is transmitted from the requesting interface controller 120 across hub interface A on DATA 251. If access is not granted, control is returned to process block 450 where another request is initiated. One of ordinary skill in the art will recognize that process blocks 420 and 430 may be processed in a variety of different sequences. For example, the process disclosed in process block 430 may be executed before the process in process block 420. Alternatively, process blocks 420 and 430 may be executed in parallel.

Figure 5:
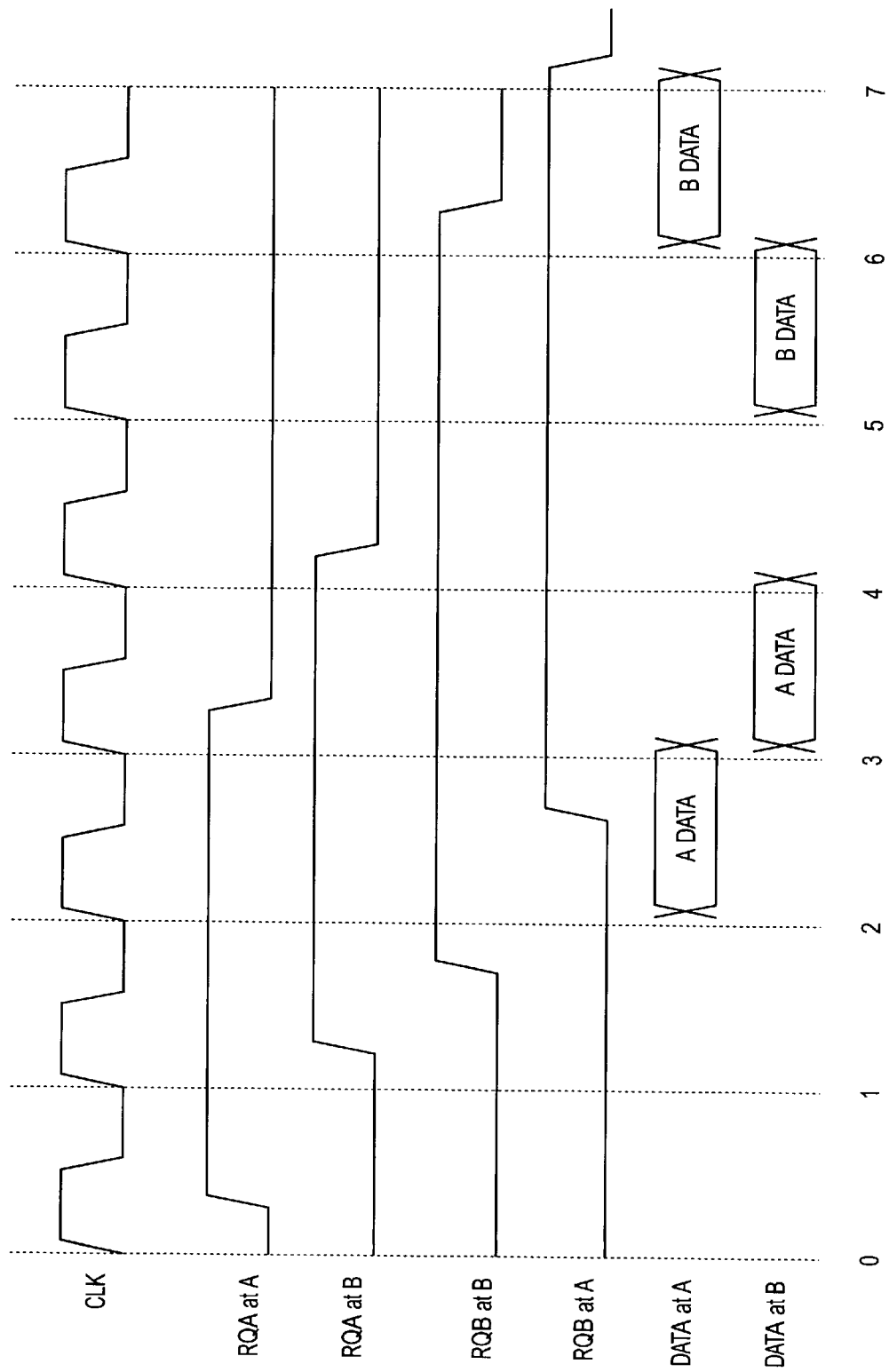
FIG. 5 is a clock diagram of one embodiment of a multi-clock propagation delay interface.
Figure 6:
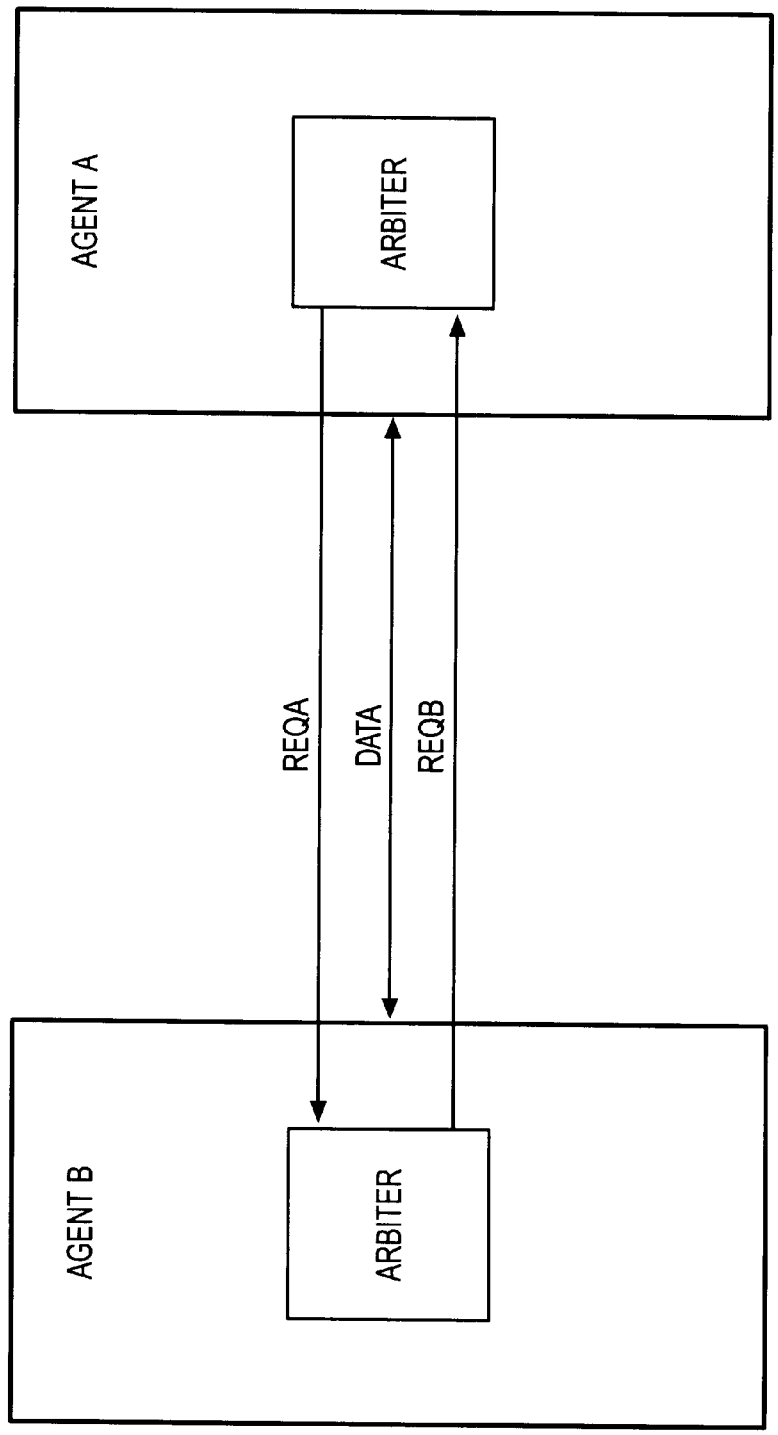
FIG. 6 is a block diagram of an exemplary hub interface.

FIG. 5 is a clock diagram of one embodiment of a multi-clock propagation delay interface. A RQA signal 254 to access hub interface A is asserted at interface controller 120A during clock period 0. The RQA signal 254 is not received at arbiter 350 within interface controller 120B until clock period 1. Similarly, the RQA signal 254 is not received at arbiter 350 within interface controller 120A until clock period 1 due to being delayed by delay module 340. As a result, the simultaneous and independent arbitration at both arbiters 350 occurs at clock edge 2. After arbitration, interface controller 120A is granted access of hub interface A and begins to transmit data to interface controller 120B during clock period 2. However, the data is not received at interface controller 120B until clock period 3 due to a one clock cycle propagation delay.

During clock period 1, a RQB signal 255 to access hub interface A is asserted at interface controller 120B. Subsequently, the RQB signal 255 is received at arbiter 350 within interface controller 120A, and arbiter 350 within interface controller 120B, during clock period 2. Accordingly, the simultaneous and independent arbitration at both arbiters 350 occurs at clock edge 3. However, since interface controller 120A has access to hub interface A, interface controller 120B does not immediately win the arbitration. Interface controller 120A maintains control of hub interface A until the data transaction has been completed during clock period 4.

Interface controller 120B, however, is not granted access to hub interface A until clock period 5 since a RQB signal 254 is not sampled deasserted at interface controller 120B until clock edge 5. During clock period 5, interface controller 120B is granted access of hub interface A and begins to transmit data to interface controller 120A. However, the data is not received at interface controller 120B until clock period 6 because of the one clock cycle propagation delay.

Although the present invention has been described with reference to hub interface A between MCH 110 and ICH 140, one of ordinary skill in the art will appreciate that the present invention may be implemented at other hub interfaces (e.g., hub interface B). Further, one of ordinary skill in the art will recognize that the invention may be implemented at interfaces in arbitration systems that do not include hub interfaces.

Referring back to FIG. 2, the hub agents provide a central connection between two or more separate buses and/or other types of communication lines. By using the hub interface to interconnect the MCH 110 and the ICH 140, improved access is provided between I/O components and the CPU/memory subsystem (e.g., increased bandwidth, protocol independence, and lower latency.) In addition, the hub interface may also improve the scalability of a computer system (e.g., upgrading from a base desktop platform to high-end desktop platforms or workstation platform) by providing a backbone for I/O building blocks.

To provide the improved interface, the hub interface includes one or more unique features. In one embodiment, transactions are transferred across the hub interface using a packet based split-transaction protocol. For example, a Request Packet is used to start a transaction and a separate Completion Packet may subsequently be used to terminate a transaction, if necessary.

Figure 7:
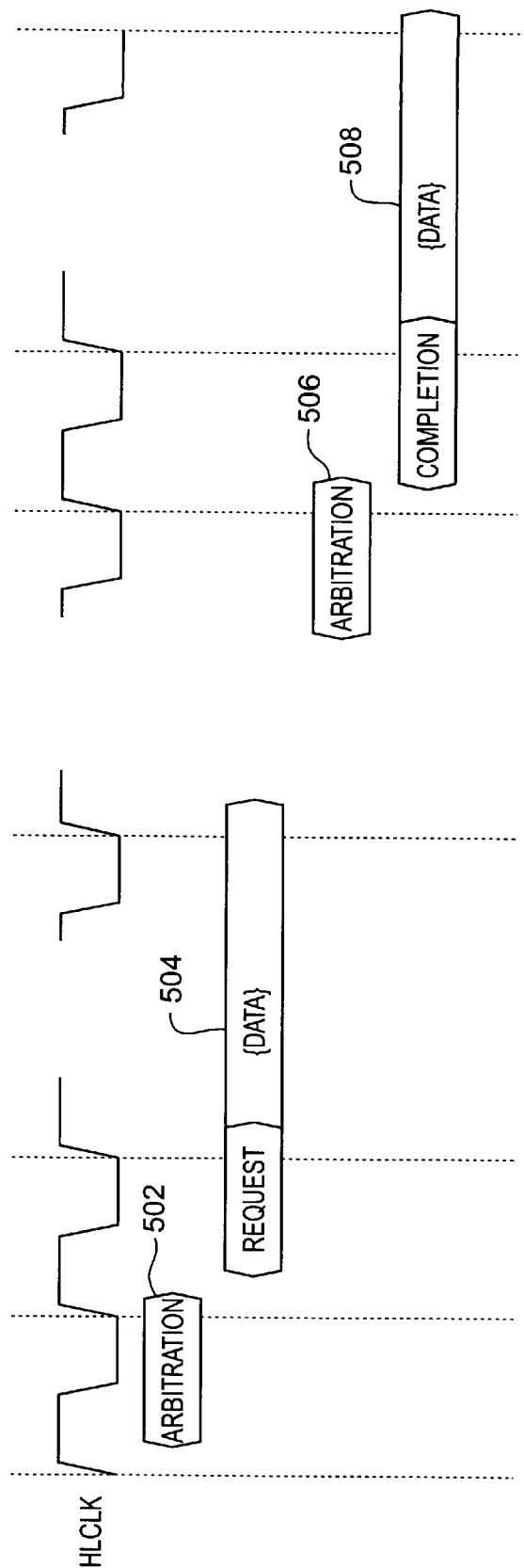
FIG. 7 is a timing diagram illustrating a split transaction implemented by one embodiment of an interface.

FIG. 7 illustrates an example of a split transaction across the hub interface. As illustrated in FIG. 7, a hub agent initially obtains ownership of the hub interface via arbitration 702. Following the arbitration, there is a request phase 704. If necessary (e.g., in the case of returning data for a read transaction), a completion phase 708 will follow the request phase. Prior to the completion phase, however, the responding hub agent, will first arbitrate 706 for ownership of the hub interface.

In between the time of transmitting a request packet and a corresponding completion packet across the hub interface, separate unrelated packets may be transmitted across the hub interface in accordance with predetermined order rules, as discussed below in more detail. For example in the case of a read request from a peripheral to memory, providing the requested data may take multiple clock cycles to have the data ready to be returned in a completion packet. During the time it takes to obtain the requested data, separate unrelated completion and/or request packets waiting in a queue/pipe of the MCH 110, may be transmitted to the ICH 140.

Furthermore, as shown in FIG. 7, each request or completion is transmitted as a packet across the interface. For write type transactions, data is associated with the request. For read type transactions, there will be data associated with the completion. In some cases, there will be more than one completion for a request for the case where the completion packet is disconnected, effectively splitting it into multiple completion packets.

In addition, in one embodiment, the hub interface uses transaction descriptors for routing of hub interface traffic as well as identifying the attributes of a transaction. For instance, the descriptors may be used to define a transaction as isochronous or asynchronous, which, as a result, may then be handled in accordance with a predefined protocol.

Furthermore, in one embodiment, the bandwidth of the interface is increased in part by transmitting the data packets via a source synchronous clock mode. Moreover, in one embodiment, the hub interface provides the increased bandwidth despite using a narrow connection (e.g., less pins/pads).

In alternative embodiments, however, a hub interface may be implemented with less than all of the unique features as discussed above, without departing from the scope of the invention. Moreover, the hub interface could also be used to interconnect bridges and and/or other components within or external to a chipset, without departing from the scope of the present invention.

Transaction, Protocol and Physical Layers

For greater clarity, the hub interface is described in three parts: a transaction layer; a protocol layer; and a physical layer. The distinctions between layers, however, is to be regarded in an illustrative rather than a restrictive sense, and is therefore does not to imply a particular preferred embodiment.

Transaction Layer

In one embodiment of the hub interface, the transaction layer supports the routing of separate transactions transmitted across the hub interface (which may consist of one or more packets.) For example, in one embodiment, the transaction layer of the hub interface generates transaction descriptors, which are included in the requests and data packets. The transaction descriptors may be used to support arbitration between queues within a hub agent (e.g., MCH), and/or to facilitate routing of requests and data packets through the hub interface.

For instance, in one embodiment, the transaction descriptors support routing of completion packets back to the request-initiating agent based on initially supplied (within a request packet) routing information. The transaction descriptors also help to reduce or possibly minimize packet-decoding logic within the hub agents.

In alternative embodiments, the transaction descriptors also provide the ability to distinguish the handling of requests based on their respective transaction attributes. For instance, the transaction attributes identified in the transaction descriptors may identify operations as Isochronous (i.e., operations that move fixed amounts of data on a regular basis; e.g., video or audio real time operations.) As a result, the operations, as identified by the transaction attributes, may be handled in accordance with a corresponding predetermined routing protocol in order to support a specific type of operation (e.g., isochronous.)

In one embodiment, the transaction descriptors include two fields: a routing field and an attribute field. In alternative embodiments, more or less fields may be used to provide one or more of the functions of the transaction descriptors, without departing from the scope of the invention.

In one embodiment, the routing field is a six-bit field used for packet routing, as shown below in Table 1. The size of the routing field, as well as the attribute field, may vary within the scope of the invention.

TABLE 1

Routing Field of Transaction Descriptor

| 5 | 4 | 3 | 2 | 1 | 0 |
|---|---|---|---|---|---|
| Hub ID | | | Pipe ID | | |

As shown in Table 1, three bits of the routing field are used for the Hub ID which identifies the hub agent that initiated the transaction. In alternative embodiments, to provide a hub interface hierarchy exceeding 8, additional bits could be used in the routing field.

For example, there may exist multiple hub interface hierarchies in a system, in which case the agent at the top of the hierarchies should be capable of routing completions back to the base of the hierarchy. In this context, "hierarchy" consists of multiple connected hub interface segments starting from a hub interface "root" agent (e.g., a MCH). For instance, computer system 100 may have only one hub interface hierarchy. FIG. 1, however, illustrates an example of computer system 100 based on multiple hub interface hierarchies. In embodiments implementing only a one hub interface hierarchy, a default value of "000" may be used in the Hub ID field.

The remaining three bits of the routing field may be used to identify internal pipes/queues within a hub interface agent. For example the I/O Control Hub may support internal USB (Universal Serial Bus) host controller traffic and Bus Mastering ID (BM-ID) traffic via separate "pipes." As such, the Pipe ID may be used communicate to the servicing agent (e.g., MCH) that traffic initiated by different "pipes" have different attributes, and may be handled in accordance with a predetermined protocol. If a hub interface agent does not implement separate internal pipes, it may use a default value of "000" in the Pipe ID field.

In an alternative embodiment, the transaction descriptors further include an attribute field. In one embodiment, the attribute field is a three-bit value, which specifies how a transaction is to be handled when a target hub interface agent receives it. In some cases, the attribute field helps a system support demanding application workload, which relies on the movement, and processing of data with specific requirements or other differentiating characteristics.

For example, the attribute field may support the isochronous movement of data between devices, as used by a few recently developed external busses. Such data movement requirements need to be maintained as data flows through the hub interface between I/O devices and the CPU/memory subsystem.

In alternative embodiments, additional transaction attributes may include the ability to differentiate between "snooped" traffic where cache coherency is enforced by hardware (i.e., chipset) and "non-snooped" traffic that relies on software mechanisms to ensure data coherency in the system. Moreover, another possible attribute would be an "explicitly prefetchable" hint, to support a form of read caching and allow for more efficient use of the main memory bandwidth.

Ordering Rules

The transaction descriptors can also be used to support ordering rules between transactions transmitted across the hub interface. For example, in one embodiment, transactions with identical transaction descriptors are executed in strong order (i.e., first come—first serve.)

Transactions having the same routing field but different attribute fields, however, may be reordered with respect to each other. For example, in one embodiment, isochronous transactions do not need to be strongly ordered with respect to asynchronous transactions.

In addition, in one embodiment of the hub interface, data transmissions are permitted to make progress over requests, either in the same direction or the opposite direction. Read completions flowing in one direction are allowed to pass read requests flowing in the same direction. And, write requests are allowed to pass read requests flowing in the same direction.

In alternative embodiments, however, the ordering rules for transactions travelling across the hub interface, may vary within the scope of the invention. For example, in one embodiment, the hub interface implements the ordering rules provided in Peripheral Component Interconnect (PCI) (Revision 2.2) to determine the flow of traffic across the hub interface in opposite directions.

Protocol Layer

In one embodiment, the hub interface uses a packet-based protocol with two types of packets: request and completion. A request packet is used for each hub interface transaction. Completion packets are used where required, for example, to return read data, or to acknowledge completion of certain types of write transactions (e.g., I/O writes and memory writes with requested completion). Completion packets are associated with their corresponding request packets by transaction descriptors and ordering, as previously discussed in the section on the Transaction Layer.

In addition, in one embodiment, the hub interface uses an arbitration protocol that is symmetric and distributed. For example, each hub agent drives a request signal, which is observed by the other agent attached to the same interface. No grant signal is used, and agents determine ownership of the interface independently.

Moreover, in one embodiment, no explicit framing signal is used. There is an implied relationship between the arbitration event that gives an agent ownership of the interface and the start of that agent's transmission. In alternative embodiment, framing signals could be used without departing from the scope of the invention.

The end of a packet transmission occurs when a hub interface agent that owns the interface (e.g., is in the process of transmitting data), releases its control of the interface by de-asserting a request signal. In addition, in one embodiment, flow control is also accomplished by using a STOP signal to retry or disconnect packets, as is described in more detail below.

Packet Definition

In one embodiment of the hub interface, data is transferred at a multiple rate (e.g., 1×, 4×, 8×) of the hub interface clock (HLCK), which in one embodiment is a common clock shared by the hub agents joined by the hub interface. The data is transmitted across a data signal path (PD) of the hub interface, which has an "interface width" of some power of two (e.g., 8, 16, 24, 32.) As a result, the hub interface may have varying data transfer granularities (i.e., transfer widths), depending upon the transfer rate and the width of the data signal path. For example, in the case of an eight-bit interface width in 4× mode, the transfer width is 32 bits per HLCK. As a result, by varying the transfer rate and/or the interface width of the data signal path, the transfer width (i.e., number of bytes transferred per HLCK) can be scaled.

In addition, in one embodiment, packets may be larger than the transfer widths. As a result, the packets are transmitted in multiple sections (i.e., packet widths.) In one embodiment, the packets are divided into packet widths the size of double words (32 bits).

In the case of a 32 bit transfer width, the bytes of a packet width are presented on the interface starting with the least significant byte (byte 0) and finishing with the most significant byte (byte 3), as shown below in Table 2. In the case of a 64 bit transfer width (e.g., a sixteen bit wide interface in 4× mode) the less significant double-word (packet width) is transferred on the lower bytes of the data signal (e.g., PD [0:7]) and the more significant double-word is transferred in parallel on the upper bytes of the data signal (e.g., PD [15:8]). The two examples are shown below in table 2.

TABLE 2

Byte Transmission Order for 8 and 16 Bit Interface Widths

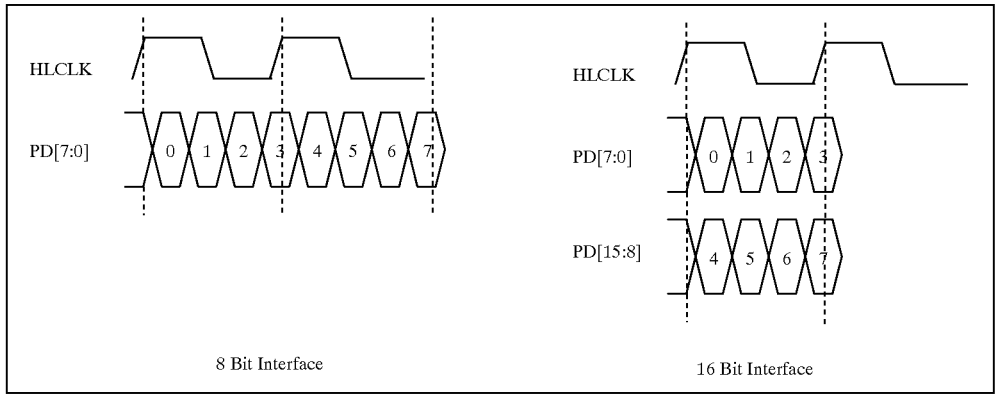

The Protocol Layer of the hub interface is also responsible for framing the data. As such, the framing rules implemented by the hub interface define how to map one or more packet widths onto a set of transfer widths. To simplify the parsing of packets into packet widths, in one embodiment of the hub interface, the following three framing rules are implemented: a header section of a packet starts on the first byte of a transfer width; a data section of a packet (if present) starts on the first byte of a transfer width; and a packet occupies an integral number of transfer widths.

Any available transfer widths not consumed by a packet may be filled with a bogus double word (DW) transmission, and will be ignored by the receiving hub agent. In alternative embodiments, more, less, and/or different framing rules may be used by the hub interface within the scope of the present invention.

Table 3 and Table 4 set forth below, illustrate examples of the framing rules given above for the case of a 64 bit transfer width.

TABLE 3

Request using 32 Bit Addressing and Containing Three Double-words of Data

| 4th Byte Transmitted on PD[15:8] \| Byte 7 \| | 3rd Byte Transmitted on PD[15:8] \| Byte 6 \| | 2nd Byte Transmitted on PD[15:8] \| Byte 5 \| | First Byte Transmitted on PD[15:8] \| Byte 4 \| | 4th Byte Transmitted on PD[7:0] \| Byte 3 \| | 3rd Byte Transmitted on PD[7:0] \| Byte 2 \| | 2nd Byte Transmitted on PD[7:0] \| Byte 1 \| | First Byte Transmitted on PD[7:0] \| Byte 0 \| |
|---|---|---|---|---|---|---|---|
| Address (32b) |||| Request Header ||||
| Second DW of Data |||| First DW of Data ||||
| {Bogus DW} |||| Third DW of Data ||||

TABLE 4

Request using 64 Bit Addressing and Containing Three Double-words of Data

| 4th Byte Transmitted on PD[15:8] \| Byte 7 \| | 3rd Byte Transmitted on PD[15:8] \| Byte 6 \| | 2nd Byte Transmitted on PD[15:8] \| Byte 5 \| | First Byte Transmitted on PD[15:8] \| Byte 4 \| | 4th Byte Transmitted on PD[7:0] \| Byte 3 \| | 3rd Byte Transmitted on PD[7:0] \| Byte 2 \| | 2nd Byte Transmitted on PD[7:0] \| Byte 1 \| | First Byte Transmitted on PD[7:0] \| Byte 0 \| |
|---|---|---|---|---|---|---|---|
| Address (31:2) | | | | Request Header | | | |
| {Bogus DW} | | | | Address (63:32) | | | |
| Second DW of Data | | | | First DW of Data | | | |
| {Bogus DW} | | | | Third DW of Data | | | | pf12

Request Packets

The packet header format for request packets, according to one embodiment, is shown below in Table 5 and Table 6. In the examples shown in Tables 5 and 6, the base header is one double-word, with one additional double-word required for 32 bit addressing, and two additional double-words required for the 64 bit addressing mode. The fields of the headers, as shown in Tables 5 & 6 are described below the tables.

In alternative embodiments of the hub interface, the fields included in the header of the request packet may vary without departing from the scope of the invention. For example, the header may include additional field, less fields, or different fields in place of the fields shown below. Moreover, the encoding of the fields may also vary without departing from the scope of the invention.

TABLE 5

Request Packet Header Format for 32 bit Addressing

Last Byte Transmitted ................................................................ First Byte Transmitted

| 31 30 29 28 27 | 26 25 24 | 23 22 21 20 19 18 17 16 | 15 14 13 12 11 10 9 8 | 7 6 5 4 | 3 2 1 0 | |
|---|---|---|---|---|---|---|
| rq/cp \| r/w \| cr \| af \| lk | Transaction Desc. Routing Field | Reserved | TD Attr \| Space \| Data Length (DW) | Last DW BE | 1st DW BE | Base |
| Addr[31:2] | | | | | R \| ea \| ct | Address |

TABLE 6

Request Packet Header Format for 64 bit Addressing

Last Byte Transmitted ................................................................ First Byte Transmitted

| 31 30 29 28 27 | 26 25 24 | 23 22 21 20 19 18 17 16 | 15 14 13 12 11 10 9 8 | 7 6 5 4 | 3 2 1 0 | |
|---|---|---|---|---|---|---|
| rq/cp \| r/w \| cr \| af \| lk | Transaction Desc. Routing Field | Reserved | TD Attr \| Space \| Data Length (DW) | Last DW BE | 1st DW BE | Base |
| Addr[31:2] | | | | | R \| ea | 32 bit component |
| Addr[63:32] | | | | | | 64 bit component |

| | |
|---|---|
| Transaction Descriptor | The Transaction Descriptor Routing and Attribute fields as previously described. |
| rq/cp | Request packets are identified with a '0' and completion packets with a '1' in this location. |
| cr | Completion required ('1') or no completion required ('0'). |
| r/w | Read ('0') or Write ('1'). This field indicates if data will be included with a completion (read) or a request (write). |
| Address Format (af) | The addressing format is either Implied ('0') or 32/64 bit ('1'). |
| Lock (lk) | Flag to indicate that the request is part of a locked sequence. Requests and completions in a locked sequence will have this bit set. Hub agents, which do not comprehend lock, ignore this flag and will fill this field with '0'. |

TABLE 6-continued

Request Packet Header Format for 64 bit Addressing

| | |
|---|---|
| Data Length | The data length is given in double-words, encoded such that the number of double-words represented is one plus this number. Thus, "000000" represents one double-word. |
| Space | This field selects the destination space type for the request. In one embodiment, possible destination spaces include Memory ("00"), and IO ("01"). |
| 1st DW BE | Byte enables for the first-double-word of any read or write request to Memory or IO. Byte enables are active low. If there is only one double-word for a request, this byte enable field is used. In one embodiment, it is illegal to issue a memory or IO read or write request with no bytes enabled. |
| Last DW BE | Byte enables for the last double-word of any read or write request. Byte enables are active low. If there is only one double-word for a request, this field must be inactive ("1111"). Byte enables may be discontiguous (e.g.: "0101"). This field is never used with special cycles since it overlaps the "Special Cycle Encoding" field. |
| Addr[31:2] | The 32 bit address is generated as it would be on PCI for same type of cycle. This double-word is included for the 32 and 64 bit addressing modes (but not for the implied addressing mode). |
| Extended Address (ea) | Indicates 32 bit addressing ('0') or 64 bit addressing ('1'). |
| Config Type (ct) | For configuration cycles only, this bit is used to indicate Type 0 ('0') or Type 1 ('1') configuration cycle type. Because configuration cycles will always be performed with 32 bit addressing, this bit is overlapped with the "Extended Address" bit. |
| Addr[63:32] | Upper address bits for 64 bit addressing mode. This double-word is included for the 64 bit addressing mode. |

Completion Packets

The header format for a completion packet, according to one embodiment, is shown below in Table 7. In one embodiment, the header is one double-word. The fields of the headers, as shown in Table 8 are described following the table.

In alternative embodiments of the hub interface, however, the fields included in the header for a completion packet may vary without departing from the scope of the invention. For example, the header may include additional field, less fields, or different fields in place of the fields as described and shown below. Moreover, the encoding of the fields may also vary without departing from the scope of the invention.

In one embodiment of hub interface, completions for memory reads may provide less than the full amount of data requested so long as the entire request is eventually completed. Likewise, completions for memory writes may indicate that less than the entire request has been completed. This might be done to satisfy a particular hub interface latency requirement for a particular platform.

In addition, for a request that requires completion, the initiator, in one embodiment, retains information about the request, which may be stored in a buffer of the initiating hub agent. For example, this information may include the transaction descriptor, the size of the packet, lock status, routing information, etc. Furthermore, when receiving the completion(s), the initiator matches the completion(s) with

TABLE 7

Completion Packet Header Format

| Last Byte Transmitted | | | | | | | | First Byte Transmitted |
|---|---|---|---|---|---|---|---|---|
| 31 30 29 28 | 27 | 26 25 24 | 23 22 21 | 20 19 18 17 16 | 15 14 13 12 11 10 9 8 | 7 6 5 4 3 2 1 0 |
| rq/cp | r/w | Reserved | lk | Transaction Desc. Routing Field | Reserved | TD Attr | Rsvd | Data Length (DW) | Completion Status |

| | |
|---|---|
| Transaction Descriptor | The Transaction Descriptor Routing and Attribute fields as previously described in the Transaction section. |
| rq/cp | Completion packets are identified with a '1' in this location. |
| r/w | Read ('0') or Write ('1'). This field indicates if data will be included with a completion (read) or a request (write). |
| Lock (lk) | Flag to indicate that the completion is part of a locked sequence. Requests and completions in a locked sequence will have this bit set. Agents, which do not comprehend lock, ignore this flag and will fill this field with '0'. |
| Data Length | The data length is given in double-words, encoded such that the number of double-words represented is one plus this number. Thus, "000000" represents one double-word. |
| Completion Status | Indicates completion status using predetermined. |
| Reserved | All reserved bits are set to '0'. | the corresponding request. In the case of multiple completions, the initiator accumulates a count of the data completed for the original request until the original request is fully completed.

Interface Arbitration and Packet Framing

In one embodiment of the hub interface, when the interface is idle, the assertion of a request from either hub agent connected to the interface is considered an arbitration event. The first agent to request wins ownership of the interface. If agents request ownership simultaneously when the hub interface is idle, the least recently serviced hub agent wins. In one embodiment, all hub agents track the least recently serviced status (e.g., via a status flag of an internal register.) In alternative embodiment, alternative arbitration routines may be used within the scope of the present invention.

Once a hub agent acquires the ownership of the interface, it will continue to own the interface until it completes its transaction, or until an allocated time bandwidth expires. For example, in one embodiment, a timeslice counter is provided in each hub agent to control bandwidth allocation and to limit an agent's interface ownership tenure. The time allotted to a hub agent (i.e., timeslice value) may be different or the same for hub interface agents attached to the same interface. The timeslice counter is started upon acquiring ownership of interface and counts hub interface base clock periods.

In one embodiment, each hub agent is responsible for managing its own timeslice allocation. As such, in one embodiment, a timeslice value may be programmed via a hub interface command register for each interface in each hub agent.

Figure 8:
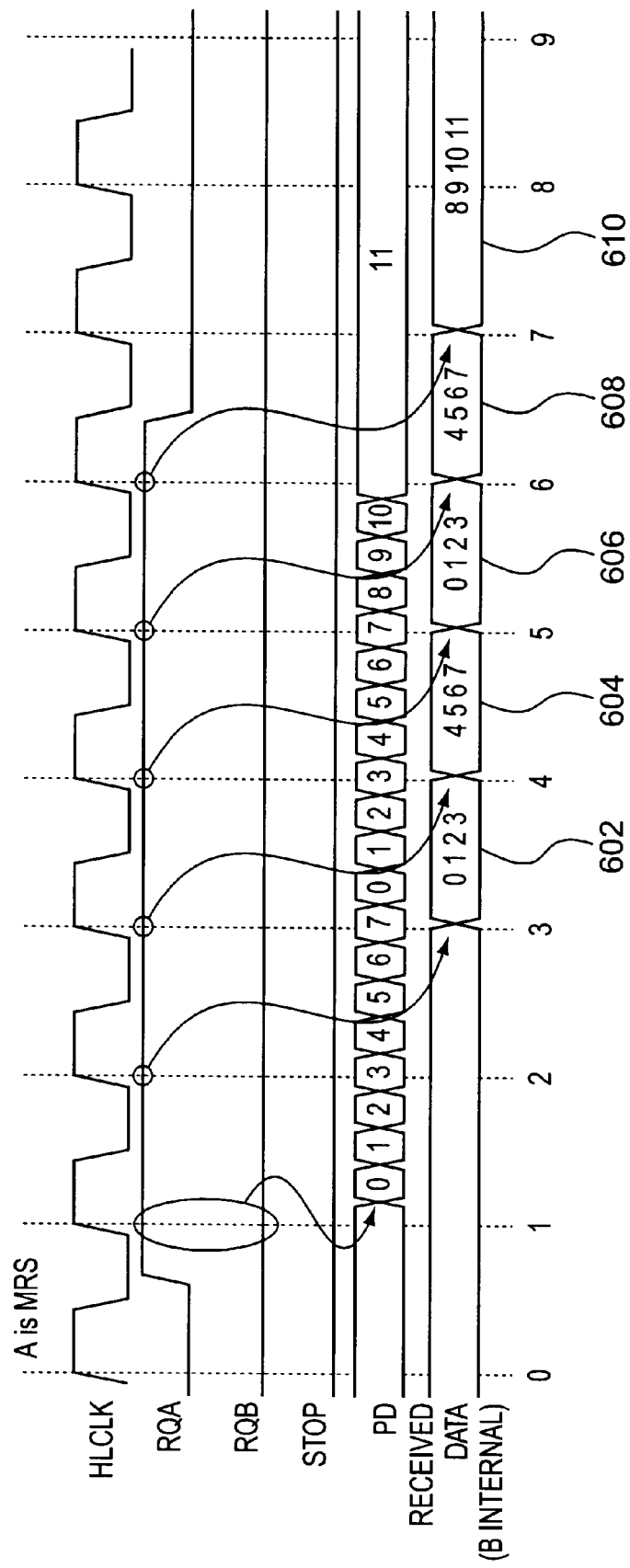
FIG. 8 is a timing diagram illustrating arbitration and transmission of data packets, according to one embodiment.

FIG. 8 illustrates an example of arbitration for the hub interface between hub agent A and agent B and the transfer of two packets. The example illustrates arbitration out of an idle interface state, with the interface then returning to idle. Moreover, in the example illustrated, the interface is using a 4× data transfer mode with eight bit data signal (PD) path. Agent A, in the example illustrated in FIG. 8, is the most recently serviced (MRS) agent. As a result, Agent A asserts its external request signal (RQA) and samples the state of the Agent B's request signal (RQB) on clock edge 1 (which is shown to be inactive) before starting packet transmission off the same edge.

In one embodiment, there is a two clock delay before the transmitted data (i.e., data from Agent A) is available internally in the receiver (i.e., Agent B), starting from clock edge 3. The first packet consists of two double-words 802 and 804 and requires two base clocks to transmit in the 4× mode. The second packet is three double-words 806, 808, and 810, and so requires three base clocks in the 4× mode.

Flow Control

In one embodiment, packets may be retried or disconnected by a receiving agent due to lack of request queue space, data buffer space, or for other reasons. In one embodiment, Flow control is accomplished using a STOP signal.

Figure 9:
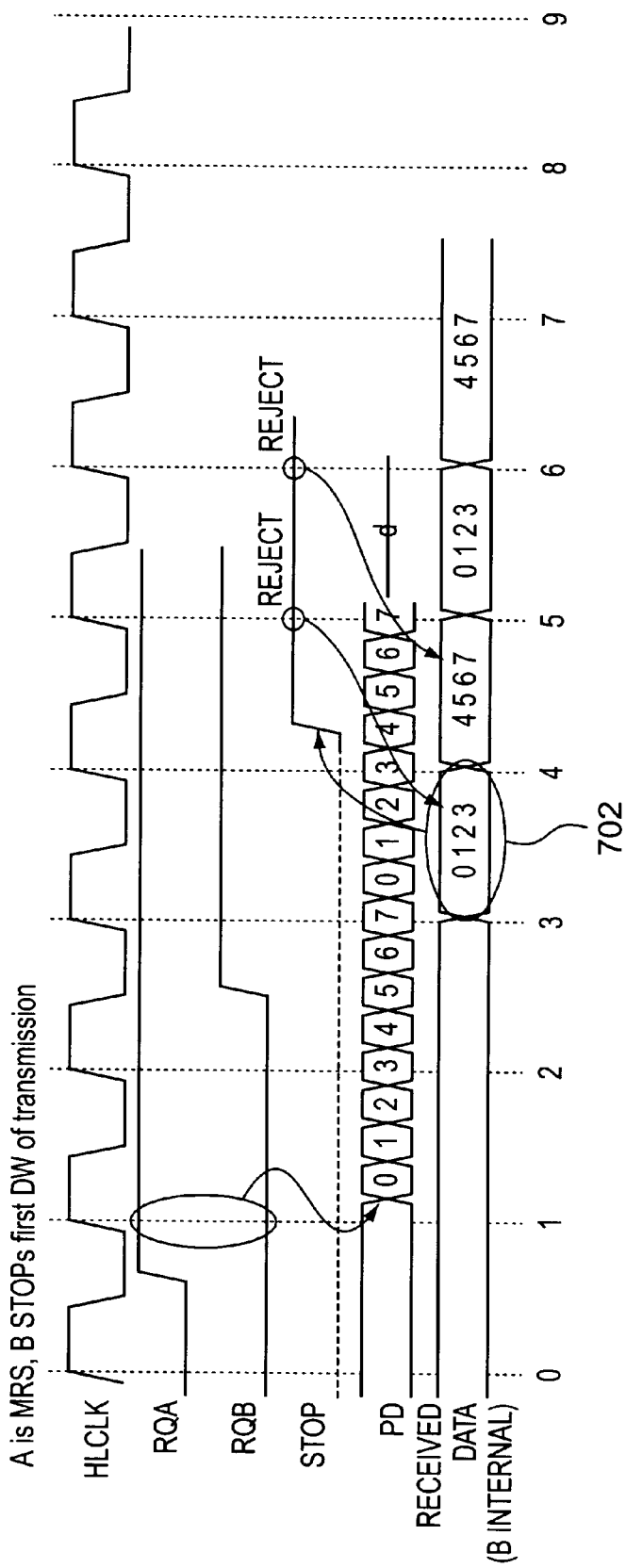
FIG. 9 is a timing diagram illustrating flow control of data packets, according to one embodiment.

FIG. 9 illustrates an example of the use of STOP signal. As illustrated, Agent A asserts its external request signal (RQA) and samples the state of the Agent B's request signal (RQB) on clock edge 1 (which is shown to be inactive) before starting packet transmission off the same edge (e.g., clock edge 1.)

Following a two clock delay, the data transmitted from Agent A is available internally in the receiver at Agent B, starting from clock edge 3. In one embodiment, following receipt of data transmitted from Agent A, is the first opportunity for Agent B to enact flow control by asserting the STOP signal, as illustrated in FIG. 9, at clock edge 4.

In addition, when ownership of PD signal changes from one hub agent to another, ownership of the STOP signal will be also be exchanged following a predetermined number of clocks. Moreover, in one embodiment, the STOP signal is sampled on base clocks, which correspond to the final transfer of a packet width. For example, in a 4× mode (using an eight bit wide PD signal), the STOP signal is sampled each base clock. However, for a 1× mode, the STOP signal is sampled each fourth clock (with the beginning of a transaction being used as a reference point).

Figure 10:
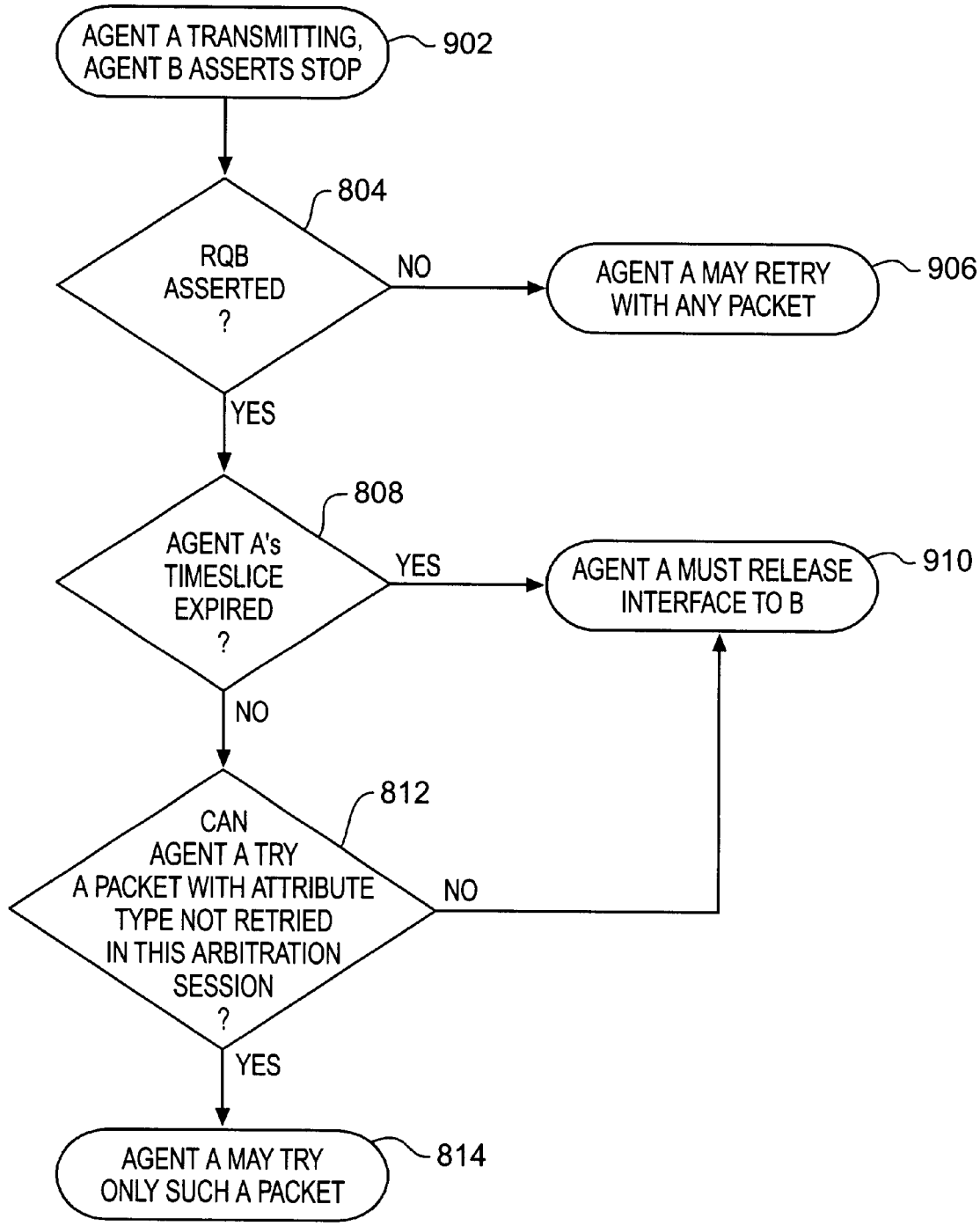
FIG. 10 illustrates a flow diagram describing the steps of responding to flow control operations according to one embodiment.

Following the reception of a STOP signal, the hub agent that receives the STOP signal determines whether it may retry sending additional packets. FIG. 10 is a flow diagram describing the steps performed by a hub agent in determining whether it may retry sending a packet following receipt of a STOP signal, according to one embodiment.

In step 1002, a hub agent that is currently transmitting packets receives a STOP signal. In response, in step 1004 the hub agent that receives the STOP signal determines if the other agent (which activated the STOP signal) is requesting ownership of the interface, by sampling the other hub agents request signal (e.g., RQB.)

If the recipient of the STOP signal determines that the agent which sent the STOP signal is not requesting ownership of the interface, in step 1006 the current owner of the interface may attempt to transmit a packet following recovery from the STOP. On the other hand, if it is determined that the agent which activated the STOP signal is requesting ownership, in step 1008, the current owner determines if its timeslice has expired.

If the timeslice for the current owner of the interface has expired, in step 810, the current owner releases ownership. If the timeslice for the current owner has not expired, the current owner may transmit a packet with an attribute that is different from the interrupted packet. More specifically, in step 1012, the current owner determines if it has a packet with a attribute type that is different from any packets that have been retried in the present arbitration session (i.e., the period of the current owner's tenure), which needs to be transmitted.

If the current owner does have a packet with a different attribute, in step 1014 the current owner may attempt to transmit the packet. Otherwise, the current owner release ownership of the interface.

Physical Interface

In one embodiment, the hub interface implements a physical interface that operates at a base frequency of either 66 MHz or 100 MHz. Other frequencies may also be used. In addition, in one embodiment, the physical interface uses a source synchronous (SS) data transfer technique which can be quad-clocked to transfer data at 4× of the base hub interface clock. As a result, in an embodiment having an 8-bit data interface (e.g., PD) operating at a base frequency of 66 MHz or 100 MHz, a bandwidth of 266 megabytes per second (MB/s) or 400 MB/s may be achieved, respectively.

Furthermore, in one embodiment, the hub interface supports a voltage operation of 1.8V, and is based on complementary metal-oxide semiconductor process (CMOS) signaling. In an alternative embodiments, however, the interface may operate at alternative frequencies and/or alternative sized data interfaces to provide varying bandwidths, and support alternative operating voltages, based on alternative signal processing, without departing from the scope of the invention.

External Signals Definition

Figure 11:
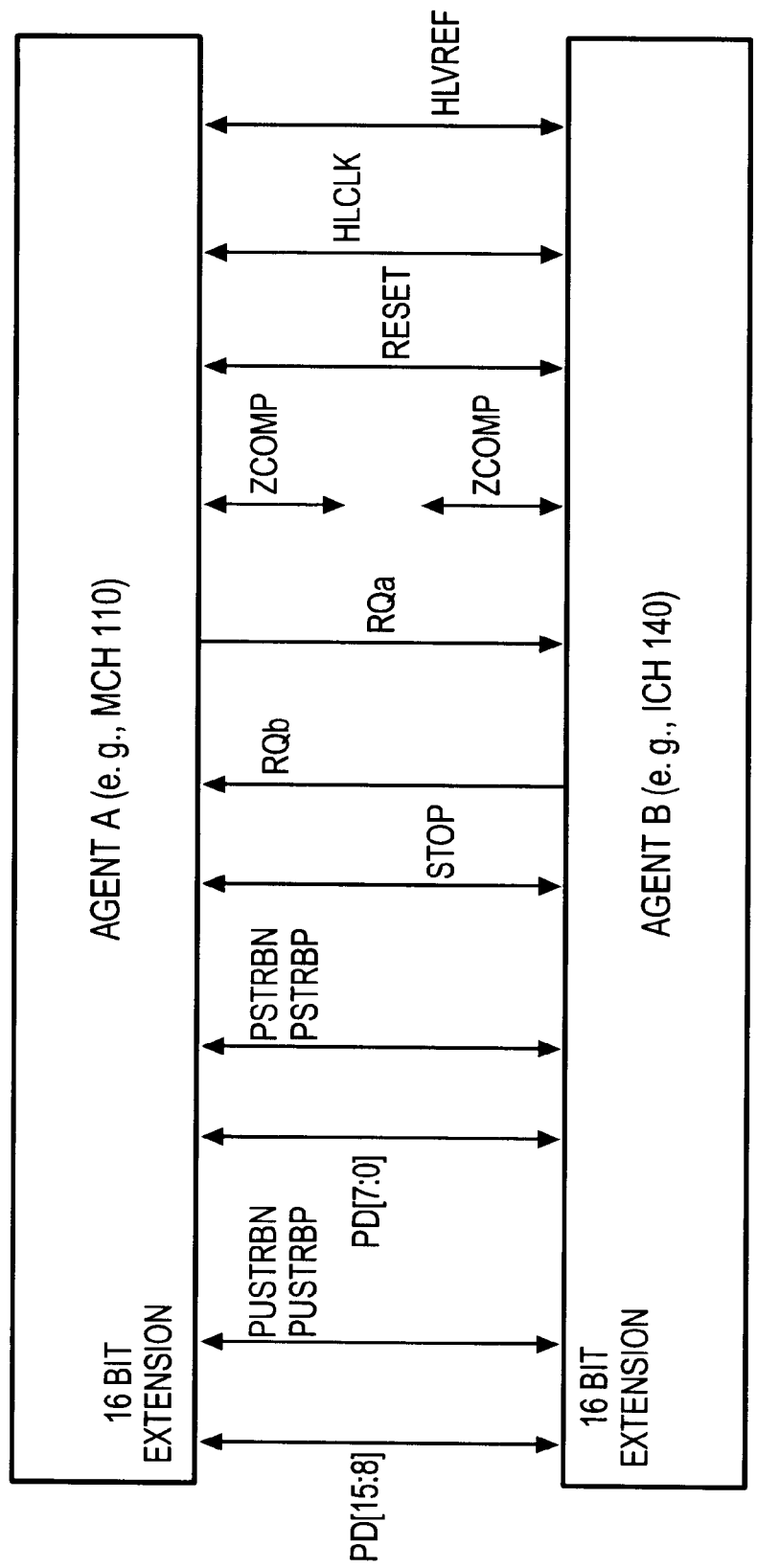
FIG. 11 illustrates the physical signal interface according to one embodiment.

FIG. 11 illustrates the physical signal interface of the hub interface between two hub agents, according to one embodiment. As shown in FIG. 11, the hub interface physical interface uses a bi-directional eight bit data bus (PD [7:0]) with a differential pair of source synchronous strobe signals (PSTRBN, PSTRBP) for data clocking. In an alternative embodiment, the interface can widened. For example, as shown in FIG. 11, an additional eight bit data bus (PD [15:8]) can also be used along with an additional pair of pair of source synchronous strobe signals (PUSTRBN, PUSTRBP.) Moreover, in an alternative embodiment, unidirectional data signals could be used.

In addition, one unidirectional arbitration signal connects each agent to the other (RQA, RQB), and a bi-directional STOP signal is used by the receiving agent to control data flow, as previously described. Additional interface signals include the system reset (Reset), common clock (HLCLK) and voltage reference signals (HLVREF). As well, signals for each hub agent (ZCOMP) to match its driver output impedance to the appropriate value to compensate for manufacturing and temperature variations are also included.

The physical signals shown in the interface illustrated in FIG. 11 are further described below in Table 8. In alternative embodiments of the hub interface, the signals included in the physical interface may vary without departing from the scope of the invention. For example, the physical interface may include more, less or different signals varying from the signals shown in FIG. 11 and further described below in Table 8.

TABLE 8

Hub Interface Signals for Eight Bit Agents

| Name | Bits (Pads) | Type | Clock Mode | Description |
|---|---|---|---|---|
| PD[7:0] | 8 | ASTS[1] | SS[2] | Packet data pins. The data interface when idle, in one embodiment, is held by active sustainers at the last voltage value to which it was driven. |
| PSTRBP | 1 | ASTS | SS | Negative PD Interface Strobe (default voltage level = VSSHL) and Positive PD Interface Strobe (idle voltage level = VCCHL) together provide timing for 4X and 1X data transfer on the PD[7:0] interface. The agent that is providing data drives this signal. PSTRBN and PSTRBP should be sensed fully differentially at the receiver. |
| PSTRBN | 1 | ASTS | SS | Positive PD Interface Strobe, see PSTRBP description above. |
| RQB | 1 | I/O | CC[3] | Active-high request from agent A (output from A, input to B) to obtain ownership of the hub interface. RQA is asserted when agent A has data available to send, and is deasserted when either all of agent A's data has been sent or agent A determines that it should release the interface. Reset voltage value is VSSHL. |
| RQA | 1 | I/O | CC | Request from agent B (output from B, input to A). See above description of RQa. |
| STOP | 1 | ASTS | CC | Used for pipelined flow control to retry or disconnect packets. |
| HLCLK | 1 | I | N/A | hub interface base clock, in one embodiment, either 66 MHz or 100 MHz. This provides timing information for the common clock signals (described further below. |
| RESET# | 1 | I | CC | Active-low reset indication to hub interface agents.[4] |
| HLVREF | 1 | I | N/A | Voltage reference (VCCHL/2) for differential inputs. In one embodiment, the voltage is generated on the motherboard through a voltage divider. |
| HLZCOMP | 1 | I/O | N/A | Provides Impedance Compensation. |

TABLE 8-continued

Hub Interface Signals for Eight Bit Agents

| Name | Bits (Pads) | Type | Clock Mode | Description |
|---|---|---|---|---|
| VCCHL | 4 | power | N/A | 1.8 V |
| VSSHL | 4 | ground | N/A | |
| Total: | 25 | | | |

[1]ASTS = Actively Sustained Tri-State.
[2]SS = Source Synchronous Mode Signal
[3]CC = Common Clock Mode Signal
[4]In one embodiment, Reset is a system-wide signal; it is an output from one component of the system and an input to the other component(s). Moreover, Reset is asynchronous with respect to HLCLK.

Common Clock Transfer Mode Operation

In one embodiment, many of the signals transmitted across the hub interface are transmitted in accordance with a common clock mode. More specifically, the timing of the signals that are transmitted via the common clock mode are referenced to a single clock (e.g., the hub interface clock.) In alternative embodiments, the signals may be tied to a system clock, exterior to the hub interface agents. Moreover, there may be more than one hub interface segment in a system, in which case different base clocks may be used for the different segments. For example, one component might implement both a 66 MHz base hub interface and a 100 MHz base hub interface.

Source Synchronous Transfer Mode Operation

In one embodiment, the packets/data are transmitted using a source synchronous clock mode, which provides a technique for multiplying the data transfer rate of data. For example, in an embodiment using 4× source synchronous clocking mode with an eight bit data signal path, transmitting a double-word (i.e., four byte) requires only one hub interface clock cycle (HLCK.) Alternatively, transmitting a double word using 1× source synchronous clocking mode on an eight bit data signal path would require a full hub interface clock cycle to complete.

More specifically, in one embodiment of source synchronous transmission, strobes (e.g., PSTRBN/PSTRBP) are sent with a data transmission in accordance with a predetermined timing relationship between the strobes and the data. The strobes are thereafter used to latch the data into the receiving hub agent.

More specifically, in one embodiment, the edges of the strobes PSTRBP/PSTRBN are used by the receiving hub agent to identify the presence and timing of data being transferred across the data signal paths. For example, as illustrated in the timing diagram of FIG. 12, in one embodiment a first data transfer corresponds to the rising edge of PSTRBP and the falling edge of PSTRBN. A second data transfer corresponds to the rising edge of PSTRBN and the falling edge of PSTRBP.

Figure 12:
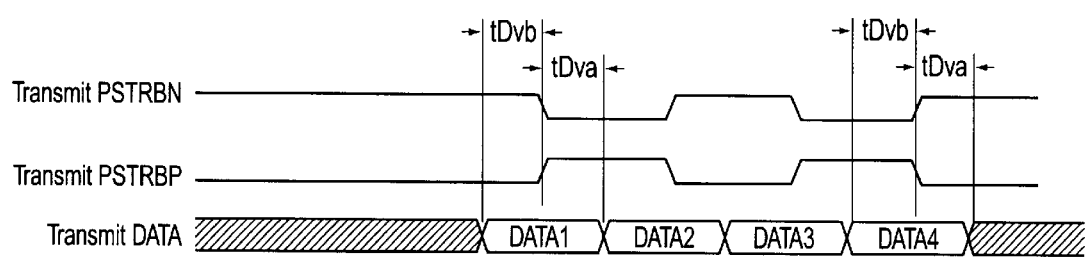
FIG. 12 is a timing diagram illustrating source synchronous clocking according to one embodiment.

In addition, in one embodiment, as further shown in FIG. 12, the transmit edges of the strobes PSTRBP/PSTRBN are positioned near the center of the data valid window. As a result, the receiving agent is given an input data sampling window to accommodate various system timing skews. Moreover, in one embodiment a minimum data valid before strobe edge (tDvb), and a minimum data valid after strobe edge (tDva) are also used by the receiving hub agent to identify and latch data being transmitted. Once the receiving hub agent latches the incoming data, the data is thereafter held for brief period to resynchronize the data with the hub interface clock (HLCK) before being passed along within the hub agent.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as the invention.

What is claimed is:

1. A computer system comprising:

a first agent;

a point to point half duplex interface coupled to the first agent; and a second agent coupled to the point to point half duplex interface, wherein the first agent delays arbitration of a request to access the point to point half duplex interface until the request is received at the second agent and the second agent delays arbitration of a request to access the point to point half duplex interface until the request is received at the first agent.

2. The computer system of claim 1 wherein the delay of arbitration at the first and second agents corresponds to an end-to-end signal delay between the first and second agents.

3. A computer system comprising:

a central processing unit (CPU);

a memory control hub (MCH) coupled to the CPU;

a first point to point interface coupled to the MCH; and an input/output control hub (ICH) coupled to the first point to point interface, wherein the MCH delays arbitration of a request to access the first point to point interface until the request is received at the ICH and wherein the ICH delays arbitration of a request to access the first point to point interface until the request is received at the MCH.

4. The computer system of claim 3 further comprising:

a second point to point interface coupled to the ICH; and a first agent coupled to the second point to point interface, wherein the ICH delays arbitration of a request to access the second point to point interface until the request is received at the first agent, and the first agent delays arbitration of a request to access the second point to point interface until the request is received at the ICH.

5. The computer system of claim 3 wherein the first agent is a network interface.

6. The computer system of claim 3 wherein the MCH includes a first interface controller coupled to the first point to point interface and the ICH includes a second interface controller coupled to the first point to point interface, wherein the first and second interface controllers receive request signals associated with the request to access the first point to point interface.

7. The computer system of claim 6 wherein the first and second interface controllers comprise:

an arbiter for granting access to the first point to point interface; and a delay module for delaying the request signals.

8. A method comprising:

receiving a first request signal to access an interface at a first interface controller;

delaying the first request signal before the request signal is received at a first arbiter within the first interface controller;

receiving the first request signal at a second arbiter within a second interface controller; and arbitrating at the first and second arbiters for access of the interface.

9. The method of claim 8 further comprising:

determining whether the first interface controller is granted access to the interface; and transmitting data from the first interface controller to the second interface controller if the first interface controller is granted access to the interface.

10. The method of claim 8 wherein the process of delaying the first request signal further comprises:

receiving the first request signal at a delay module;

delaying the first request signal for a predetermined number of clock cycles; and transmitting the first request signal the first arbiter.

11. The method of claim 8 further comprising:

receiving a second request signal to access the interface at a second interface controller;

delaying the second request signal before the second request signal is received at the second arbiter;

receiving the second request signal at the first arbiter;

arbitrating at the first and second arbiters for access of the interface;

determining whether the second interface controller is granted access to the interface; and transmitting data from the second interface controller to the first interface controller if the second interface controller is granted access to the interface.

12. A method comprising:

receiving a first request signal to access an interface at a first interface controller;

receiving the first request signal at a second arbiter within a second interface controller;

delaying the first request signal before the request signal is received at a first arbiter within the first interface controller; and arbitrating at the first and second arbiters for access of the interface.

13. A hub interface comprising:

a first hub agent;

a point to point link coupled to the first hub agent; and a second hub agent coupled to the point to point link, wherein the first agent delays arbitration of a request to access the point to point link until the request is received at the second agent, and the second agent delays arbitration of a request to access the point to point link until the request is received at the first agent.

14. The hub interface of claim 13 wherein the first agent includes a first interface controller coupled to the point to point link and the second agent includes a second interface controller coupled to the point to point link, wherein the first and second interface controllers receive request signals associated with the request to access the point to point link.

15. The hub interface of claim 14 wherein the first and second interface controllers comprise:

an arbiter for granting access to the point to point link; and a delay module for delaying the request signals.

16. The hub interface of claim 13 wherein the delay of arbitration at the first and second hub agents corresponds to an end-to-end signal delay between the first and second hub agents.

* * * * *